US010168588B2

(12) United States Patent
Yoon et al.

(10) Patent No.: US 10,168,588 B2
(45) Date of Patent: Jan. 1, 2019

(54) DISPLAY SUBSTRATE AND LIQUID CRYSTAL DISPLAY DEVICE COMPRISING THE SAME (71) Applicant: SAMSUNG DISPLAY CO., LTD., Yongin-si, Gyeonggi-do (KR)

(72) Inventors: Yeogeon Yoon, Suwon-si (KR); Joonggun Chong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 71 days.

(21) Appl. No.: 15/336,213

(22) Filed: Oct. 27, 2016

(65) Prior Publication Data
US 2017/0192284 A1 Jul. 6, 2017

(30) Foreign Application Priority Data

Jan. 6, 2016 (KR) ........................ 10-2016-0001619

(51) Int. Cl.
G02F 1/1343 (2006.01)
G02F 1/1368 (2006.01)
G02F 1/1362 (2006.01)
G02F 1/1333 (2006.01)
(Continued)

(52) U.S. Cl.
CPC ........ *G02F 1/13439* (2013.01); *G02F 1/1368* (2013.01); *G02F 1/133345* (2013.01); *G02F 1/133707* (2013.01); *G02F 1/134309* (2013.01); *G02F 1/136286* (2013.01); *G02F 1/133512* (2013.01); *G02F 2001/136218* (2013.01);
(Continued)

(58) Field of Classification Search
CPC .......... G02F 1/13439; G02F 1/133707; G02F 1/1368; G02F 1/136286; G02F 1/133345; G02F 1/134309; G02F 1/2001; G02F 1/136222; G02F 2001/136218; G02F 2201/123; G02F 2201/121; G02F 1/133512
See application file for complete search history.

(56) References Cited

U.S. PATENT DOCUMENTS

2009/0096947 A1    4/2009  Teranishi et al.
2010/0019998 A1*   1/2010  You .................. G02F 1/133707
                                              345/87
(Continued)

FOREIGN PATENT DOCUMENTS

KR    1020010003750 A    1/2001
KR    1020080071489 A    8/2008
(Continued)

Primary Examiner — Kevin Quarterman
(74) Attorney, Agent, or Firm — Cantor Colburn LLP (57) ABSTRACT A display device includes a base substrate, a gate line on the base substrate, the gate line extending in a first direction, a data line on the base substrate, the data line extending in a second direction which intersects the first direction, a thin film transistor ("TFT") which is connected to the gate line and the data line, a first insulating layer on the TFT, a shielding electrode on the first insulating layer, a second insulating layer on the shielding electrode, and a pixel electrode on the second insulating layer, the pixel electrode connected to the TFT where the pixel electrode may have a substantially rhombus shape and overlaps at least one of the gate line and the data line.

22 Claims, 10 Drawing Sheets (51) Int. Cl.
*G02F 1/1337* (2006.01)
*G02F 1/1335* (2006.01)

(52) U.S. Cl.
CPC ............ *G02F 2001/136222* (2013.01); *G02F 2201/121* (2013.01); *G02F 2201/123* (2013.01)

(56) References Cited

U.S. PATENT DOCUMENTS

| | | | |
|---|---|---|---|
| 2013/0194536 A1* | 8/2013 | Tae, II | G02F 1/133707 349/143 |
| 2013/0201432 A1* | 8/2013 | Yun | G02F 1/134309 349/123 |
| 2014/0098315 A1* | 4/2014 | Jung | G02F 1/136209 349/42 |
| 2015/0092132 A1* | 4/2015 | Kang | H01L 27/1214 349/43 |
| 2015/0277174 A1 | 10/2015 | Utsunomiya et al. | |
| 2015/0323845 A1* | 11/2015 | Chang | G02F 1/1343 349/42 |

FOREIGN PATENT DOCUMENTS

| | | |
|---|---|---|
| KR | 1020090038369 A | 4/2009 |
| KR | 1020130060603 A | 6/2013 |

\* cited by examiner

DISPLAY SUBSTRATE AND LIQUID CRYSTAL DISPLAY DEVICE COMPRISING THE SAME

This application claims priority to Korean Patent Application No. 10-2016-0001619, filed on Jan. 6, 2016, and all the benefits accruing therefrom under 35 U.S.C. § 119, the content of which in its entirety is herein incorporated by reference.

BACKGROUND

1. Field

Exemplary embodiments of the invention relate to a display substrate and a liquid crystal display ("LCD") device including the display substrate, and more particularly, to a display substrate improved in terms of display quality and an LCD device including the display substrate.

2. Description of the Related Art

A display device is classified into a liquid crystal display ("LCD") device, an organic light emitting diode ("OLED") display device, a plasma display panel ("PDP") devices, electrophoretic display ("EPD") device, and the like, based on a light emitting scheme thereof.

Among the various types of the display device, an LCD device generally includes two substrates including electrodes formed thereon and a liquid crystal layer interposed between the two substrates. Upon applying a voltage to the electrodes, liquid crystal molecules of the liquid crystal layer are rearranged, such that an amount of transmitted light may be controlled. The LCD device includes an alignment layer which may align the liquid crystal molecules to thereby uniformly control the liquid crystal layer.

In recent times, a technology to improve viewing angle properties is being used, in which a pixel electrode is divided into multiple domains and liquid crystal molecules have pre-tilts in different directions for the respective multiple domains.

SUMMARY

Since a conventional pixel electrode has a quadrangular shape, liquid crystal molecules may not have a desired pre-tilt at an edge portion of the pixel electrode due to a fringe field, which may result in degraded display quality.

Exemplary embodiments of the invention are directed to a liquid crystal display ("LCD") device including a pixel electrode having modified shape and disposition to achieve improved display quality.

According to an exemplary embodiment of the invention, a display device includes a base substrate, a gate line on the base substrate, the gate line extending in a first direction, a data line on the base substrate, the data line extending in a second direction which intersects the first direction, a thin film transistor ("TFT") which is connected to the gate line and the data line, a first insulating layer on the TFT, a shielding electrode on the first insulating layer, a second insulating layer on the shielding electrode, and a pixel electrode on the second insulating layer, the pixel electrode connected to the TFT. The pixel electrode may have a substantially rhombus shape and overlaps at least one of the gate line and the data line.

In an exemplary embodiment, an edge of the pixel electrode may overlap at least one of the gate line and the data line.

In an exemplary embodiment, the shielding electrode may include a transparent conductive material.

In an exemplary embodiment, the shielding electrode may be disposed over an entire surface of the base substrate.

In an exemplary embodiment, the shielding electrode may be only disposed on a portion of the base substrate corresponding to at least one of the gate line and the data line.

In an exemplary embodiment, the shielding electrode may receive a direct current ("DC") voltage.

In an exemplary embodiment, the pixel electrode may include a first stem portion which extends in a first direction, a second stem portion which extends in the second direction, the second direction intersecting the first direction, and first, second, third, and fourth branch portions extending from at least one of the first stem portion and the second stem portion in an inclined manner. At least one of the first stem portion and the second stem portion may overlap at least one of the gate line and the data line.

In an exemplary embodiment, the first stem portion and the second stem portion may have a cross-shape.

In an exemplary embodiment, the TFTs may be connected to the gate line and the data line alternately in a zigzag shape in a plan view.

In an exemplary embodiment, at least one of the gate line and the data line may be bent in a zigzag shape along an edge of the pixel electrode.

According to an exemplary embodiment of the invention, an LCD device includes a display substrate, an opposing substrate disposed to oppose the display substrate, and a liquid crystal layer between the display substrate and the opposing substrate. The display substrate includes a base substrate, a gate line on the base substrate, the gate line extending in a first direction, a data line on the base substrate, the data line extending in a second direction which intersects the first direction, a TFT which is connected to the gate line and the data line, a first insulating layer on the TFT, a shielding electrode on the first insulating layer, a second insulating layer on the shielding electrode, and a pixel electrode on the second insulating layer, the pixel electrode connected to the TFT. The pixel electrode may have a substantially rhombus shape and overlaps at least one of the gate line and the data line.

In an exemplary embodiment, an edge of the pixel electrode may overlap at least one of the gate line and the data line.

In an exemplary embodiment, the shielding electrode may include a transparent conductive material.

In an exemplary embodiment, the shielding electrode may be disposed over an entire surface of the base substrate.

In an exemplary embodiment, the shielding electrode may be only disposed on a portion of the base substrate corresponding to at least one of the gate line and the data line.

In an exemplary embodiment, the shielding electrode may receive a DC voltage.

In an exemplary embodiment, the pixel electrode may include a first stem portion which extends in a first direction, a second stem portion which extends in the second direction, the second direction intersecting the first direction, and first, second, third, and fourth branch portions extending from at least one of the first stem portion and the second stem portion in an inclined manner. At least one of the first stem portion and the second stem portion may overlap at least one of the gate line and the data line.

In an exemplary embodiment, the first stem portion and the second stem portion may have a cross-shape.

In an exemplary embodiment, the gate line and the data line may be perpendicular to each other, and the TFTs may be connected to the gate line and the data line alternately in a zigzag shape.

In an exemplary embodiment, at least one of the gate line and the data line may be bent in a zigzag shape along an edge of the pixel electrode.

In an exemplary embodiment, the opposing substrate may include an opposing base substrate, and a common electrode on the opposing base substrate.

In an exemplary embodiment, the common electrode may have a cross-shaped slit which overlaps the pixel electrode.

The foregoing is illustrative only and is not intended to be in any way limiting. In addition to the illustrative exemplary embodiments, embodiments, and features described above, further exemplary embodiments, embodiments, and features will become apparent by reference to the drawings and the following detailed description.

BRIEF DESCRIPTION OF THE DRAWINGS

The above and other features and exemplary embodiments of the invention will be more clearly understood from the following detailed description taken in conjunction with the accompanying drawings, in which.

DETAILED DESCRIPTION

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention, and like reference numerals refer to like elements throughout the specification.

Figure 1:
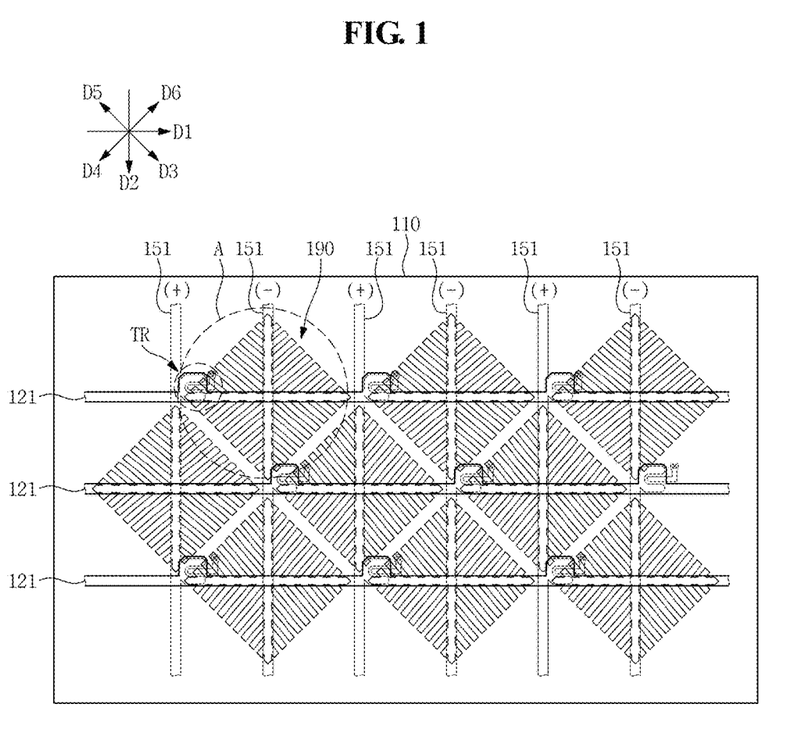
FIG. 1 is a plan view illustrating a portion of a plurality of pixel electrodes in an exemplary embodiment of a liquid crystal display ("LCD") device.
Figure 2:
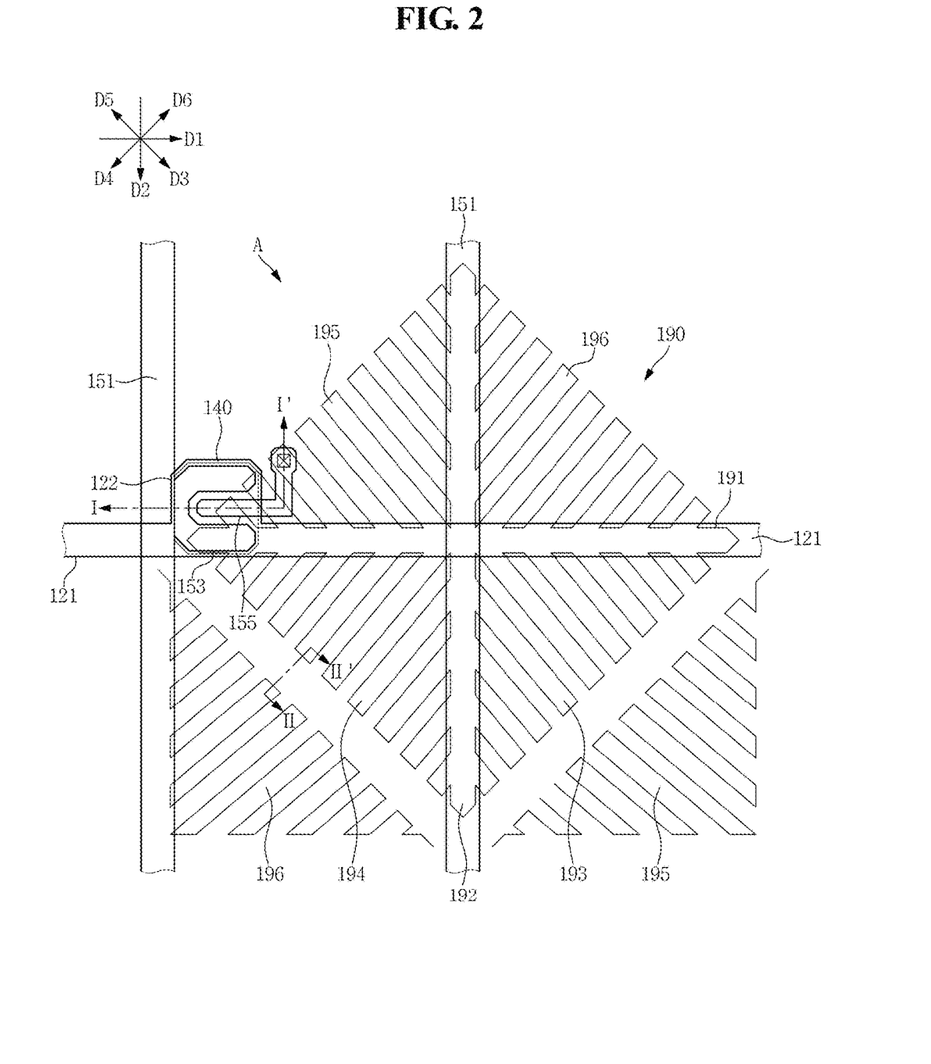
FIG. 2 is an enlarged view illustrating portion "A" of FIG. 1.
Figure 3:
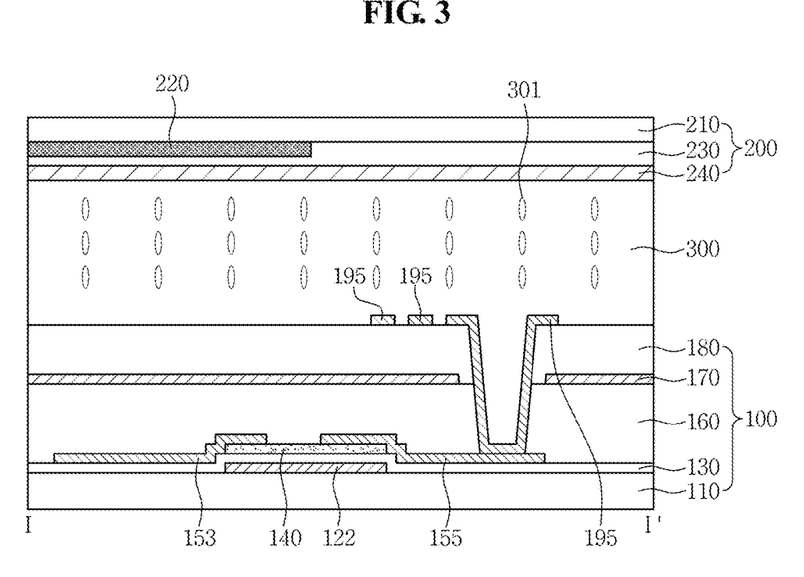
FIG. 3 is a cross-sectional view taken along line I-I' of FIG. 2.

FIG. 1 is a plan view illustrating a portion of a plurality of pixel electrodes in an exemplary embodiment of a liquid crystal display ("LCD") device, FIG. 2 is an enlarged view illustrating portion "A" of FIG. 1, and FIG. 3 is a cross-sectional view taken along line I-I' of FIG. 2.

Referring to FIGS. 1, 2, and 3, an exemplary embodiment of the LCD device includes a display substrate 100, an opposing substrate 200, and a liquid crystal layer 300 between the display substrate 100 and the opposing substrate 200. In addition, an exemplary embodiment of the LCD device may further include a backlight unit (not illustrated) which outputs light toward the display substrate 100.

The display substrate 100 may include a base substrate 110, gate wirings 121 and 122, a gate insulating layer 130, a semiconductor layer 140, data wirings 151, 153, and 155, a first insulating layer 160, a shielding electrode 170, a second insulating layer 180, and a pixel electrode 190, for example.

In an exemplary embodiment, the base substrate 110 may be an insulating substrate, such as a plastic substrate, which has light transmitting characteristics and flexibility. However, the exemplary embodiment is not limited thereto, and the base substrate 110 may include a hard substrate such as a glass substrate.

In an exemplary embodiment, the gate wirings 121 and 122 may include or consist of aluminum (Al) or alloys thereof, silver (Ag) or alloys thereof, copper (Cu) or alloys thereof, molybdenum (Mo) or alloys thereof, chromium (Cr), tantalum (Ta), titanium (Ti), and/or the like, for example.

In addition, the gate wirings 121 and 122 may have a multilayer structure including two or more conductive layers (not illustrated) having different physical properties. In an exemplary embodiment, a conductive layer of the multilayer structure may include or consist of metal having low resistivity to reduce signal delay or voltage drop, such as, an aluminum (Al)-based metal, a silver (Ag)-based metal, a copper (Cu)-based metal, and another conductive layer of the multilayer structure may include a material that is found to impart an excellent contact property with indium tin oxide ("ITO") and indium zinc oxide ("IZO"), such as a molybdenum-based metal, chromium, titanium, tantalum, and the like.

Other examples of the multilayer structure may include a chromium lower layer and an aluminum upper layer, an aluminum lower layer and a molybdenum upper layer, a titanium lower layer and a copper upper layer. However, the invention is not limited thereto, and the gate wirings 121 and 122 may include various other kinds and a different number of layers of metals and conductors.

The gate wirings 121 and 122 include a gate line 121 extending in a direction, for example, a first direction D1, and a gate electrode 122 branching off from the gate line 121 and extending therefrom. The gate wirings 121 and 122 may be simultaneously provided in a same process.

The gate line 121 transmits a gate signal, and the gate electrode 122 defines three terminals of a thin film transistor ("TFT") TR, along with a source electrode 153 and a drain electrode 155 to be described below.

The gate insulating layer 130 is disposed over the base substrate 110 on which the gate wirings 121 and 122 are disposed. In an exemplary embodiment, the gate insulating layer 130 may include silicon oxide ($SiO_x$) or silicon nitride ($SiN_x$). In an exemplary embodiment, the gate insulating layer 130 may further include aluminum oxide, titanium oxide, tantalum oxide, or zirconium oxide.

The semiconductor layer 140 is disposed on a portion of the first insulating layer 130 corresponding to the gate electrode 122. In an exemplary embodiment, the semiconductor layer 140 may include a semiconductor material such as amorphous silicon and crystalline silicon. In an exemplary embodiment, the semiconductor layer 140 may include an oxide semiconductor such as indium gallium zinc oxide ("IGZO"), ZnO, $SnO_2$, $In_2O_3$, $Zn_2SnO_4$, $Ge_2O_3$, and $HfO_2$ and may include a compound semiconductor such as GaAs, GaP, and InP.

In an exemplary embodiment, the semiconductor layer 140 is depicted as substantially overlapping the gate electrode 122. However, exemplary embodiments are not limited thereto, and the semiconductor layer 140 may substantially overlap the data wirings 151, 153, and 155 to be described hereinbelow.

The data wirings 151, 153, and 155 are disposed on the base substrate 110 on which the semiconductor layer 140 is disposed. The data wirings 151, 153, and 155 may include or consist of the same material as that forming the gate wirings 121 and 122.

The data wirings 151, 153, and 155 include a data line 151 extending in a direction, e.g., a second direction D2, which intersects the gate line 121, a source electrode 153 branching off from the data line 151 to extend onto the semiconductor layer 140, and a drain electrode 155 spaced apart from the source electrode 153 and overlapping a portion of the semiconductor layer 140, for example. The data wirings 151, 153, and 155 may be simultaneously provided in a same process.

An ohmic contact layer (not illustrated) may further be disposed among the semiconductor layer 140 and each of the source electrode 153 and the drain electrode 155 so as to improve electric characteristics. A channel through which electric charges moves when the TFT TR is driven is defined in the semiconductor layer 140 between the source electrode 153 and the drain electrode 155.

In an exemplary embodiment of the LCD device, the gate line 121 extends in the first direction D1, and the data line 151 extends in the second direction D2 which intersect the first direction D1. Hereinafter, for ease of description, a direction forming about 45 degrees with respect to the first direction D1 is defined as a third direction D3, a direction forming about 135 degrees with respect thereto is defined as a fourth direction D4, a direction forming about 225 degrees with respect thereto is defined as a fifth direction D5, and a direction forming about 315 degrees with respect thereto is defined as a sixth direction D6. The third, fourth, fifth, and sixth directions D3, D4, D5, and D6 are depicted as being perpendicular to one another, but exemplary embodiments are not limited thereto. In another exemplary embodiment, the third, fourth, fifth, and sixth directions D3, D4, D5, and D6 may intersect one another with predetermined degrees thereamong, although not perpendicular to one another.

The gate electrode 122, the semiconductor layer 140, the source electrode 153, and the drain electrode 155 are collectively referred to as the TFT TR, and the TFT TR may be connected to the gate line 121 and the data line 151 alternately in a zigzag shape in a plan view.

The gate line 121 sequentially outputs gate signals in response to a gate control signal externally applied to a gate driver (not shown), for example. The gate signal includes a gate-on voltage that may turn on the TFTs TR that are connected to a selected one of the gate lines 121, and a gate-off voltage that may turn off the TFTs TR that are connected to unselected ones of the gate lines 121.

The data line 151 sequentially outputs data voltages in response to a data control signal externally applied to a data driver (not shown), for example. In an exemplary embodiment, in terms of the data voltage, voltages having different polarities may be input alternately at each frame, or in an alternative exemplary embodiment, voltages having different polarities may be input to adjacent ones of the data lines 151 in a single frame (refer to FIG. 1).

In an exemplary embodiment of the LCD device, the TFTs TR are alternatively disposed in a zigzag shape in a plan view. Accordingly, although voltages having different polarities are applied to the adjacent ones of the data lines 151 in a single frame, an apparent inversion is recognized as a dot inversion. That is, although a driver inversion corresponds to a column inversion, the apparent inversion may become a dot inversion.

As such, in the case that the apparent inversion becomes a dot inversion, a luminance difference that occurs due to a kick-back voltage is distributed when the data voltage has a positive polarity and a negative polarity such that a vertical flickering line may not appear.

In addition, in the case that the driver inversion becomes a column inversion, polarities of the data voltages applied to respective ones of the data lines 151 in a single frame are the same, and thus a charging rate of the pixel electrode 190 may be improved.

The first insulating layer 160 is disposed on the base substrate 110 on which the data wirings 151, 153, and 155 are disposed. In an exemplary embodiment, the first insulating layer 160 has a monolayer structure or a multilayer structure including, for example, silicon oxide, silicon nitride, a photosensitive organic material, or a low dielectric constant (low-k) insulating material, e.g., a-Si:C:O or a-Si:O:F.

In addition, in the case that the LCD device has a color filter on array ("COA") structure in which the color filter is disposed on a display substrate, the first insulating layer 160 may be a color filter. In an exemplary embodiment, the color filter may have one of red, green, blue, cyan, magenta, yellow, and white colors. In an exemplary embodiment, the three primary colors of red, green, and blue or cyan, magenta, and yellow may define a base pixel group for color formation. However, the invention is not limited thereto, and the color filter may have various other colors.

The shielding electrode 170 is disposed on the first insulating layer 160. The shielding layer 170 may include transparent conductive materials. In an exemplary embodiment, the shielding electrode 170 may include ITO or IZO, for example.

Figure 4:
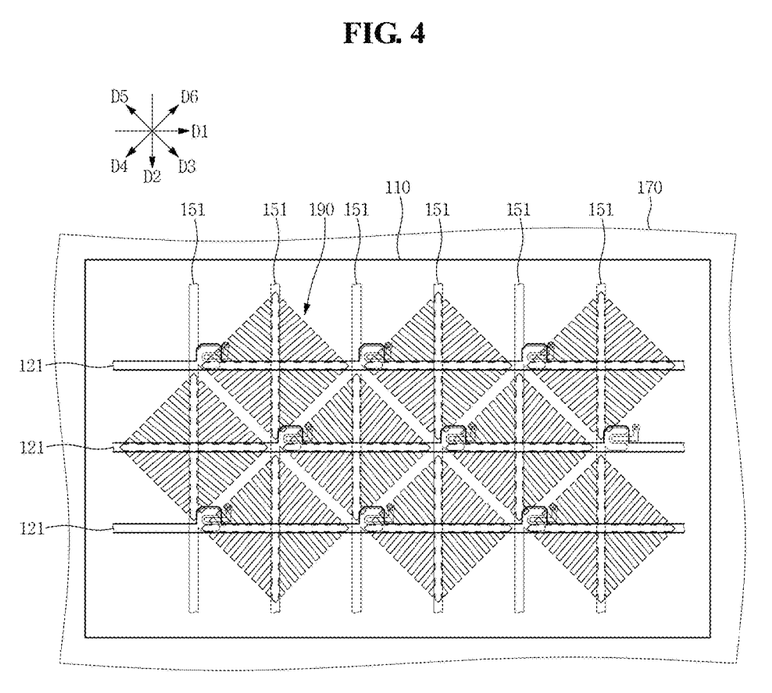
FIG. 4 is a plan view illustrating an exemplary embodiment of a shielding electrode.
Figure 5:
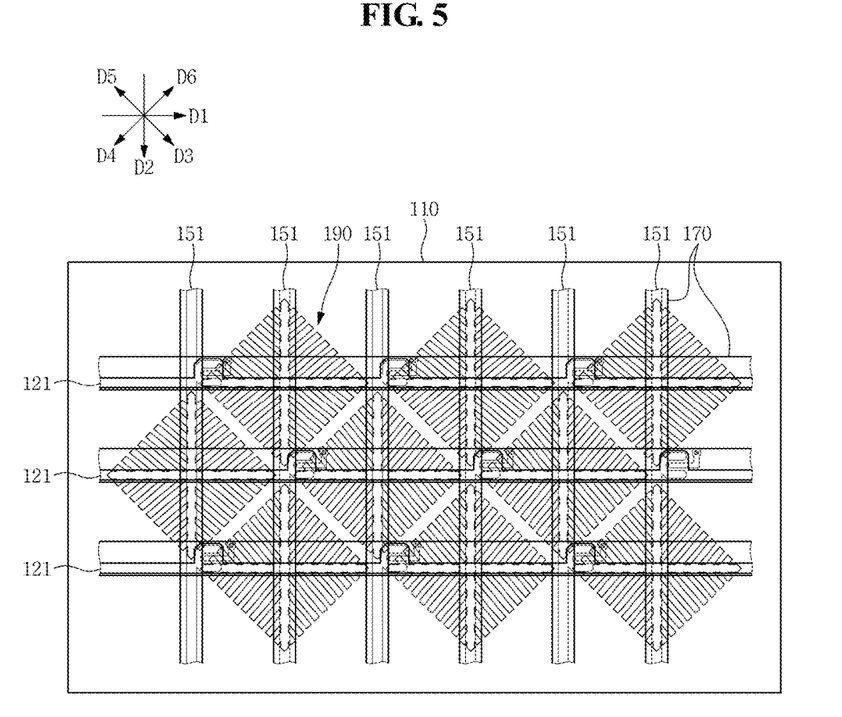
FIG. 5 is a plan view illustrating an alternative exemplary embodiment of a shielding electrode.

FIG. 4 is a plan view illustrating an exemplary embodiment of the shielding electrode 170, and FIG. 5 is a plan view illustrating an alternative exemplary embodiment of the shielding electrode 170.

Referring to FIG. 4, an exemplary embodiment of the shielding electrode 170 may be disposed over an entire surface of the base substrate 110 on which the first insulating layer 160 is disposed.

In addition, referring to FIG. 5, an alternative exemplary embodiment of the shielding electrode 170 may only be disposed on portions of the base substrate 110 corresponding to at least one of the gate line 121 and the data line 151.

In an exemplary embodiment of the LCD device, as the pixel electrode 190 overlaps at least one of the gate line 121 and the data line 151, the shielding electrode 170 may be disposed to thereby significantly reduce a parasitic capacitance that is generated between the pixel electrode 190 and each of the gate line 121 and the data line 151, which will be described further hereinbelow.

The shielding electrode 170 may be grounded, or may receive a direct current ("DC") voltage having a predetermined level. In an exemplary embodiment, the shielding electrode 170 may receive the same voltage as a voltage applied to the common electrode 240 described hereinbelow, or may receive the same voltage as a voltage applied to the storage electrode (not illustrated), for example.

Figure 6:
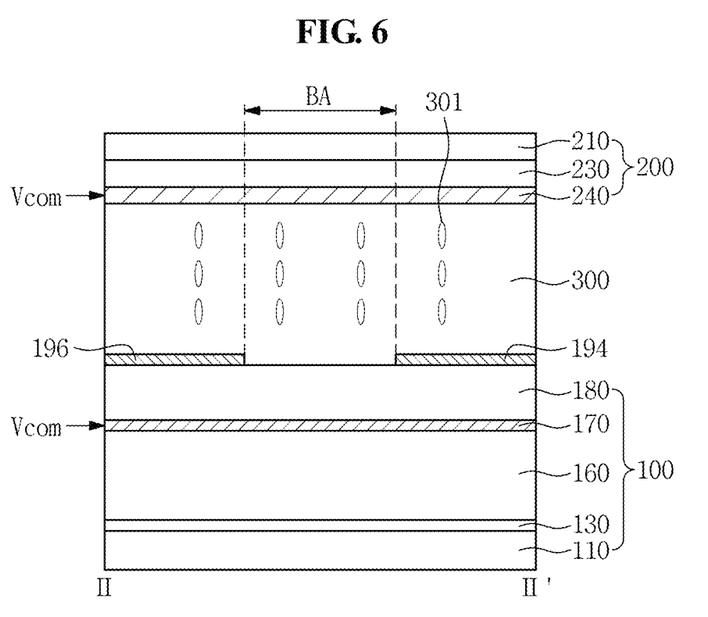
FIG. 6 is a cross-sectional view taken along line II-IP of FIG. 2.

FIG. 6 is a cross-sectional view taken along line II-IP of FIG. 2.

Referring to FIG. 6, in the case that the shielding electrode 170 receives a voltage Vcom having a level the same as that of a voltage applied to the common electrode 240, light may not be transmitted through an area BA among portions of the pixel electrode 190, e.g., among a second branch portion 194 and a fourth branch portion 196 to be described hereinbelow, by an electric field thereamong without using an additional light blocking member 220.

Referring to FIGS. 1, 2, and 3, the second insulating layer 180 is disposed on the base substrate 110 on which the shielding electrode 170 is disposed. In an exemplary embodiment, the second insulating layer 180 has a monolayer structure or a multilayer structure including, for example, silicon oxide, silicon nitride, a photosensitive organic material, or a low dielectric constant (low-k) insulating material, e.g., a-Si:C:O or a-Si:O:F.

The pixel electrode 190 is disposed on the second insulating layer 180. In an exemplary embodiment, the pixel electrode 190 may be an electrode including a transparent conductor such as ITO or IZO. The pixel electrode 190 may pass through the first insulating layer 160, the shielding electrode 170, and the second insulating layer 180 to be connected to the drain electrode 155.

Figure 7A:
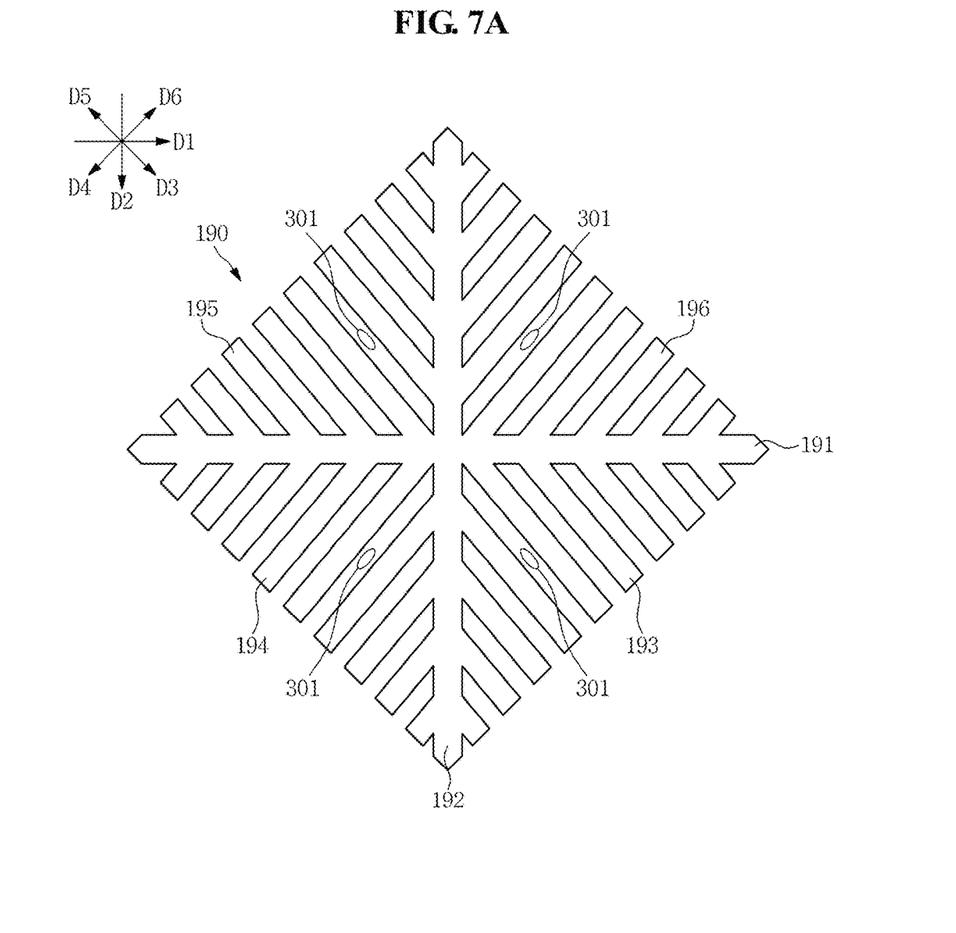
FIG. 7A is a plan view illustrating an exemplary embodiment of a pixel electrode.
Figure 7B:
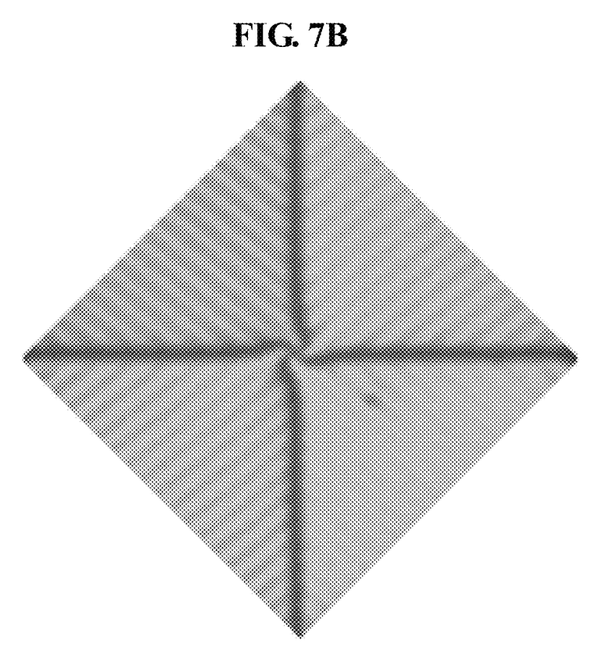
FIG. 7B is a picture illustrating a simulation result on a transmittance of the pixel electrode illustrated in FIG. 7A.

FIG. 7A is a plan view illustrating an exemplary embodiment of the pixel electrode 190, and FIG. 7B is a picture illustrating a simulation result on a transmittance of the pixel electrode 190 illustrated in FIG. 7A.

Referring to FIGS. 1, 3, and 7A, an exemplary embodiment of the pixel electrode 190 includes a first stem portion 191 extending in the first direction D1, a second stem portion 192 extending from the first stem portion 191 in the second direction D2 which intersects the first direction D1, and first, second, third, and fourth branch portions 193, 194, 195, and 196 extending in an inclined manner with respect to at least one of the first stem portion 191 and the second stem portion 192.

The first branch portion 193 extends in a third direction D3 from at least one of the first stem portion 191 and the second stem portion 192, the second branch portion 194 extends in a fourth direction D4 from at least one of the first stem portion 191 and the second stem portion 192, the third branch portion 195 extends in a fifth direction D5 from at least one of the first stem portion 191 and the second stem portion 192, and the fourth branch portion 196 extends in a sixth direction D6 from at least one of the first stem portion 191 and the second stem portion 192.

A first domain is defined by the first branch portion 193, a second domain is defined by the second branch portion 194, a third domain is defined by the third branch portion 195, and a fourth domain is defined by the fourth branch portion 196.

Liquid crystal molecules 301 are aligned parallel to extension directions of the first, second, third, and fourth branch portions 193, 194, 195, and 196. That is, the liquid crystal molecules 301 are aligned in different directions in the first, second, third, and fourth domains, respectively.

In an exemplary embodiment, the pixel electrode 190 including the first stem portion 191, the second stem portion 192, and the first, second, third, and fourth branch portions 193, 194, 195, and 196 may have a substantially rhombus (e.g., lozenge) shape, for example. As used herein, the "substantially rhombus shape" means that a shape defined by an imaginary line connecting edges of the first stem portion 191, the second stem portion 192, and the first, second, third, and fourth branch portions 193, 194, 195, and 196 corresponds to a rhombus shape.

In an exemplary embodiment of the pixel electrode 190, at least one of the first stem portion 191 and the second stem portion 192 is disposed to overlap at least one of the gate line 121 and the data line 151 such that transmittance degradation may be significantly reduced.

Referring to FIG. 7B, since an exemplary embodiment of the pixel electrode 190 has a rhombus shape, the liquid crystal molecules 301 disposed in an edge portion of the pixel electrode 190 may be controlled parallel to the extension directions of the first, second, third, and fourth branch portions 193, 194, 195, and 196. Accordingly, transmitting efficiency of the LCD device may be significantly enhanced.

Figure 8:
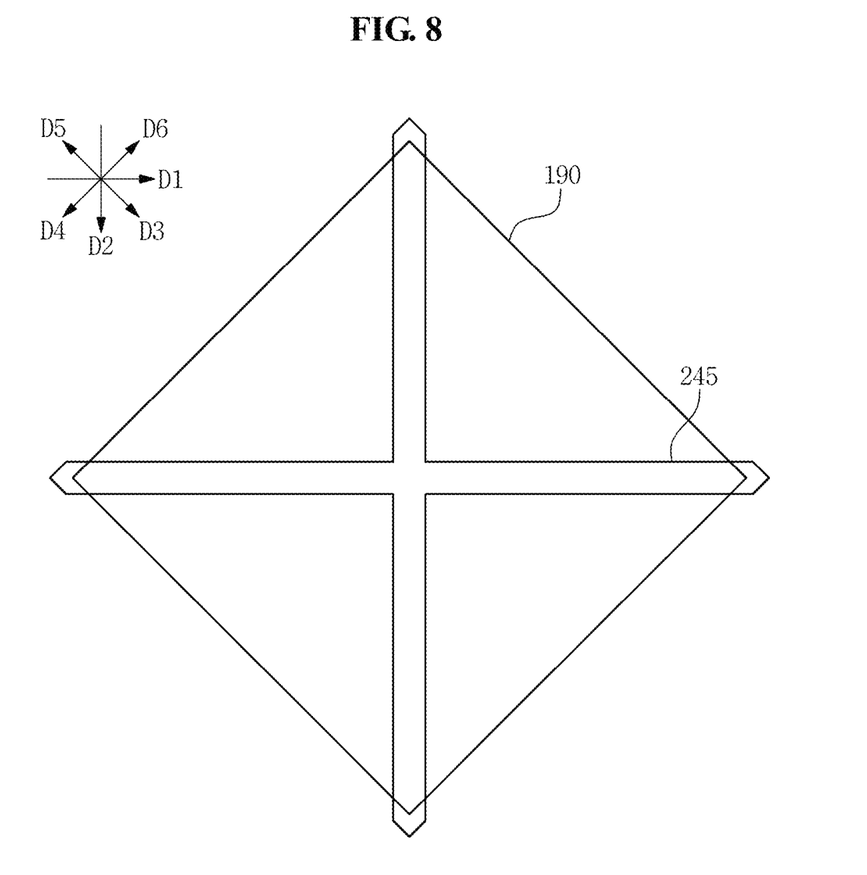
FIG. 8 is a plan view illustrating an alternative exemplary embodiment of a pixel electrode.

FIG. 8 is a plan view illustrating an alternative exemplary embodiment of the pixel electrode 190.

Referring to FIG. 8, an alternative exemplary embodiment of the pixel electrode 190 may be a whole-plate electrode that has a rhombus shape. In such an exemplary embodiment, a cross-shaped slit 245 that overlaps the pixel electrode 190 may be defined in the common electrode 240. However, exemplary embodiments are not limited thereto, and the common electrode 240 may be a whole-plate electrode. In addition, the pixel electrode 190 may overlap at least one of the gate line 121 and the data line 151. In particular, an edge of the pixel electrode 190 may overlap at least one of the gate line 121 and the data line 151.

Referring to FIGS. 1, 2, and 3, an alignment layer (not illustrated) may be disposed on the pixel electrode 190. The alignment layer aligns liquid crystal molecules 301 of the liquid crystal layer 300 so that a major axis of the liquid crystal molecules 301 is perpendicular to surfaces of the display substrate 100 and the opposing substrate 200 in the absence of an electric field between the display substrate 100 and the opposing substrate 200.

The opposing substrate 200 includes an opposing base substrate 210, a light blocking member 220, an overcoat layer 230, and a common electrode 240.

In an exemplary embodiment, the opposing base substrate 210 may be an insulating substrate, such as a plastic substrate, which has light transmitting characteristics and flexibility. However, exemplary embodiments are not limited thereto, and the opposing base substrate 210 may include a hard substrate such as a glass substrate.

The light blocking member 220 is disposed on the opposing base substrate 210. In an exemplary embodiment, the light blocking member 220 may be referred to as a black matrix, and may include a metal such as chromium oxide (CrOx) or an opaque organic-layer material. The light blocking member 220 may be omitted, and may be disposed on the display substrate 100.

The overcoat layer 230 is disposed on the light blocking member 220. The overcoat layer 230 planarizes an uneven surface of a layer therebelow, e.g., the light blocking member 220, and efficiently suppresses or prevents exudation of undesired materials from the layer therebelow.

The common electrode 240 is disposed on the overcoat layer 230. An exemplary embodiment of the common electrode 240 may include a whole-plate electrode including a transparent conductor such as ITO or IZO. In an alternative exemplary embodiment, a cross-shaped slit may be defined in the common electrode 240 to define a plurality of domains.

Figure 9:
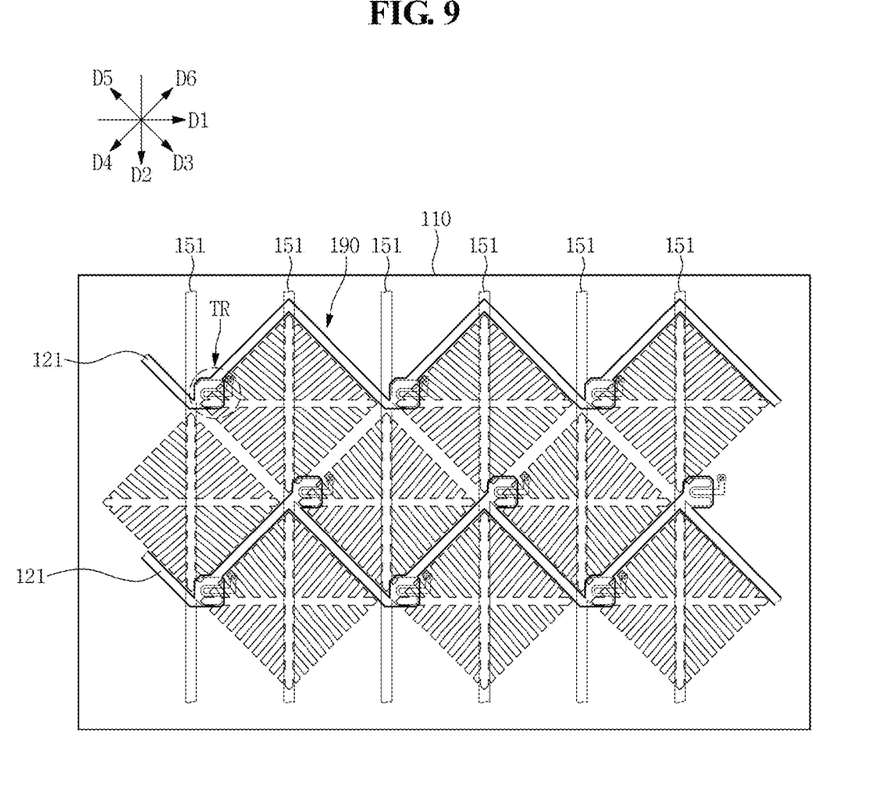
FIG. 9 is a plan view illustrating a portion of a plurality of pixel electrodes in an alternative exemplary embodiment of an LCD device.

FIG. 9 is a plan view illustrating a portion of a plurality of pixel electrodes 190 in an alternative exemplary embodiment of an LCD device. Herein, descriptions with regard to an exemplary embodiment described hereinabove will be omitted in the descriptions with regard to an alternative exemplary embodiment to be described hereinbelow.

Referring to FIG. 9, an alternative exemplary embodiment of the LCD device includes a base substrate 110, a gate line 121 disposed on the base substrate 110 and extending in a diagonal direction, a data line 151 extending in a second direction D2 which intersects the first direction D1, a TFT TR connected to the gate line 121 and the data line 151, and a pixel electrode 190 connected to the TFT TR.

An alternative exemplary embodiment of the pixel electrode 190 may have a substantially rhombus shape, and at least one of the gate line 121 and the data line 151 may be bent in a zigzag shape along an edge of the pixel electrode 190.

In FIG. 9, the gate line 121 is depicted as being bent in a zigzag shape along the edge of the pixel electrode 190 which has a rhombus shape, but exemplary embodiments are not limited thereto. In alternative exemplary embodiments, the data line 151 may be bent in a zigzag shape along the edge of the pixel electrode 190, or alternatively, both of the gate line 121 and the data line 151 may be bent in a zigzag shape along the edge of the pixel electrode 190.

As set forth hereinabove, in one or more exemplary embodiments of the LCD device, since the pixel electrode that includes the stem portion and the branch portion has a rhombus shape, irregular movements of the liquid crystals that may occur at an edge portion of a conventional pixel electrode having a quadrangular shape may be significantly reduced or prevented, such that display quality may be improved.

In one or more exemplary embodiments of the LCD device, at least one of the gate line and the data line overlaps the stem portion of the pixel electrode such that transmittance degradation may be significantly reduced, i.e., minimized.

In one or more exemplary embodiments of the LCD device, the shielding electrode is disposed among the pixel electrode and each of the gate line and the data line such that a parasitic capacitance among the pixel electrode and each of the gate line and the data line may be significantly reduced.

In one or more exemplary embodiments of the LCD device, the TFTs are alternately disposed in a zigzag shape in a plan view, and thus a flickering phenomenon showing vertical flickering lines may be prevented.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A display substrate comprising:
   a base substrate;
   a gate line on the base substrate, the gate line extending in a first direction;
   a data line on the base substrate, the data line extending in a second direction which intersects the first direction;
   a thin film transistor which is connected to the gate line and the data line;
   a first insulating layer on the thin film transistor;
   a shielding electrode on the first insulating layer;
   a second insulating layer on the shielding electrode; and
   a pixel electrode on the second insulating layer, the pixel electrode connected to the thin film transistor,
   wherein the pixel electrode has a substantially rhombus shape and overlaps an entire width defining at least one of the gate line and the data line.

2. The display substrate as claimed in claim 1, wherein the pixel electrode has at least four edges defining the rhombus shape and each of the four edges extends in a third or fourth direction which intersects the first and second direction.

3. The display substrate as claimed in claim 1, wherein the shielding electrode comprises a transparent conductive material.

4. The display substrate as claimed in claim 1, wherein the shielding electrode is disposed over an entire surface of the base substrate.

5. The display substrate as claimed in claim 1, wherein the shielding electrode is only disposed on a portion of the base substrate corresponding to at least one of the gate line and the data line.

6. The display substrate as claimed in claim 1, wherein the shielding electrode receives a direct current voltage.

7. The display substrate as claimed in claim 1, wherein the pixel electrode comprises:
   a first stem portion which extends in a first direction;
   a second stem portion which extends in the second direction, the second direction intersecting the first direction; and
   first, second, third, and fourth branch portions extending from at least one of the first stem portion and the second stem portion in an inclined manner,
   wherein at least one of the first stem portion and the second stem portion overlaps at least one of the gate line and the data line.

8. The display substrate as claimed in claim 7, wherein the first stem portion and the second stem portion have a cross-shape and extend to four corners defining the rhombus shape of the pixel electrode.

9. The display substrate as claimed in claim 1, wherein the thin film transistors are connected to the gate line and the data line alternately in a zigzag shape in a plan view.

10. The display substrate as claimed in claim 1, wherein at least one of the gate line and the data line is bent in a zigzag shape along an edge of the pixel electrode.

11. A liquid crystal display device comprising:
    a display substrate;
    an opposing substrate disposed to oppose the display substrate; and
    a liquid crystal layer between the display substrate and the opposing substrate,
    wherein the display substrate comprises:
    a base substrate;
    a gate line on the base substrate, the gate line extending in a first direction;
    a data line on the base substrate, the data line extending in a second direction which intersects the first direction;
    a thin film transistor which is connected to the gate line and the data line;
    a first insulating layer on the thin film transistor;
    a shielding electrode on the first insulating layer;
    a second insulating layer on the shielding electrode; and
    a pixel electrode on the second insulating layer, the pixel electrode connected to the thin film transistor, and
    wherein the pixel electrode has a substantially rhombus shape and overlaps an entire width defining at least one of the gate line and the data line.

12. The liquid crystal display device as claimed in claim 11, wherein the pixel electrode has at least four edges defining the rhombus shape and each of the four edges extends in a third or fourth direction which intersects the first and second direction.

13. The liquid crystal display device as claimed in claim 11, wherein the shielding electrode comprises a transparent conductive material.

14. The liquid crystal display device as claimed in claim 11, wherein the shielding electrode is disposed over an entire surface of the base substrate.

15. The liquid crystal display device as claimed in claim 11, wherein the shielding electrode is only disposed on a portion of the base substrate corresponding to at least one of the gate line and the data line.

16. The liquid crystal display device as claimed in claim 11, wherein the shielding electrode receives a direct current voltage.

17. The liquid crystal display device as claimed in claim 11, wherein the pixel electrode comprises:
    a first stem portion which extends in a first direction;
    a second stem portion which extends in the second direction, the second direction intersecting the first direction; and
    first, second, third, and fourth branch portions extending from at least one of the first stem portion and the second stem portion in an inclined manner,
    wherein at least one of the first stem portion and the second stem portion overlaps at least one of the gate line and the data line.

18. The liquid crystal display device as claimed in claim 17, wherein the first stem portion and the second stem portion have a cross-shape and extend to four corners defining the rhombus shape of the pixel electrode.

19. The liquid crystal display device as claimed in claim 11, wherein the gate line and the data line are perpendicular to each other, and the thin film transistors are connected to the gate line and the data line alternately in a zigzag shape.

20. The liquid crystal display device as claimed in claim 11, wherein at least one of the gate line and the data line is bent in a zigzag shape along an edge of the pixel electrode.

21. The liquid crystal display device as claimed in claim 18, wherein the opposing substrate comprises:
    an opposing base substrate; and
    a common electrode on the opposing base substrate.

22. The liquid crystal display device as claimed in claim 21, wherein a cross-shaped slit which overlaps the pixel electrode is defined in the common electrode.

* * * * *